United States Patent [19]

Hakala

[11] Patent Number: 4,841,426

[45] Date of Patent: Jun. 20, 1989

[54] METHOD FOR CONTROLLING THE SEMICONDUCTOR SWITCHES OF A RECTIFIER BRIDGE CONNECTED TO AN A.C. MAINS SUPPLY, AND A CONTROL UNIT DESIGNED FOR APPLYING THE METHOD

[75] Inventor: Harri Hakala, Hyvinkaa, Finland

[73] Assignee: Kone Elevator GmbH, Baar, Switzerland

[21] Appl. No.: 135,111

[22] Filed: Dec. 18, 1987

[30] Foreign Application Priority Data

Jan. 13, 1987 [FI] Finland ................................. 870119

[51] Int. Cl.[4] .......................................... H02M 5/458
[52] U.S. Cl. ..................................... 363/37; 363/127; 363/132; 318/801
[58] Field of Search ....................... 363/34, 37, 74, 76, 363/127, 129, 131, 132, 161, 163; 318/801, 803, 809

[56] References Cited

U.S. PATENT DOCUMENTS

| | | | |
|---|---|---|---|
| 4,521,840 | 6/1985 | Hoadley | 363/35 |
| 4,620,272 | 10/1986 | Fulton et al. | 363/37 X |
| 4,730,242 | 3/1988 | Divan | 363/37 |

FOREIGN PATENT DOCUMENTS

| | | | |
|---|---|---|---|
| 0009384 | 1/1985 | Japan | 363/37 |
| 0199481 | 9/1986 | Japan | 318/801 |
| 2084357 | 4/1982 | United Kingdom | 363/37 |

Primary Examiner—Patrick R. Salce
Assistant Examiner—Kristine Peckman
Attorney, Agent, or Firm—Fleit, Jacobson, Cohn, Price, Holman & Stern

[57] ABSTRACT

A method of controlling inverting semiconductor switches connected in parallel with rectifying components of a rectifier bridge connected to an a.c. supply network, and a control unit for carrying out the method are disclosed, in which a comparison is made of a voltage proportional to the phase voltage with a reference voltage composed of two voltages, one of which is proportional to that phase voltage which has the highest absolute value and the other of which is proportional to the rectified voltage.

6 Claims, 2 Drawing Sheets

METHOD FOR CONTROLLING THE SEMICONDUCTOR SWITCHES OF A RECTIFIER BRIDGE CONNECTED TO AN A.C. MAINS SUPPLY, AND A CONTROL UNIT DESIGNED FOR APPLYING THE METHOD

FIELD OF THE INVENTION

The present invention relates to a method for controlling semiconductor switches performing a d.c.-a.c. conversion and connected in parallel with rectifying components of a rectifier bridge connected to an a.c. mains voltage supply, and to a control unit for applying the method.

DESCRIPTION OF THE RELATED ART

In many applications it is necessary that a rectifier bridge used as a d.c. source permits both input and output of power. Such a necessity is present e.g. in an inverter fed from a constant-voltage supply and controlling an a.c. motor handling a load that is capable of delivering power. A typical load with such a capability is an elevator car. Bidirectional power flow may be implemented using e.g. transistor or thyristor inverters in a.c. motor drives.

At present, bidirectional d.c. sources are often implemented using thyristor bridges connected between an a.c. supply and a d.c. circuit. The thyristor bridges, which may work either with or without circulating currents, supply power imparted by the load back into the a.c. network. The operation of a circulating-current-free thyristor bridge d.c. source is based on the principle that one of the two bridges is conducting, depending on the direction of the power flow. The time required for changing bridges is relatively long. A circulating-current-free circuit can also be implemented by means of a diode bridge and a thyristor bridge, using an autotransformer to prevent power circulation. In this case, the thyristor bridge, which performs the inversion, can be held in the conducting state all the time.

In a circulating-current thyristor bridge circuit, both bridges can also be held continuously in the conducting state. In this case, there is no need for supervising the direction of the energy flow. The drawbacks of thyristor circuits are the complexity of the thyristor control circuits and the relatively long time required for firing and turning off the thyristors.

At present, d.c. sources are also implemented using diode bridges between a three-phase a.c. network and the d.c. circuit. The diode bridge rectifies the three-phase voltage when the direction of the power flow is from the a.c. network to the d.c. circuit. To convert the d.c. voltage back into a three-phase a.c. voltage when the power flows from the d.c. circuit into the a.c. network, transistors are connected in parallel with the diodes of the diode bridge. The transistor control voltages are produced by diodes from the 3-phase voltage so that each transistor conducts during the times when the diode connected in parallel with it conducts. The conduction times of the transistors are shortened to reduce the circulating power by connecting a Zener diode in series with the controller of each transistor.

When the motor is braked, the voltage in the d.c. circuit of the frequency converter rises and the inverting transistors connected in the rectifier bridge are turned on, so that a current can flow from the d.c. circuit into the a.c. network. As the transistors are driven directly from the three-phase network by means of diodes, the duration of the control pulse is constant. This method has the drawback that, since the firing angle is constant, a circulating current, flowing through a capacitor in the d.c. circuit, is always set up. Moreover, networks using different voltages require different control circuits, because the firing angle is controlled by Zener diodes. In addition, the firing angle is changed by variations in the mains voltage.

SUMMARY OF THE INVENTION

It is accordingly an object of the present invention to eliminate the above-described drawbacks of the prior art.

According to the invention, there is provided a method of controlling inverting semiconductor switches connected in parallel with rectifying components of a rectifier bridge connected to an a.c. supply network, comprising the steps of forming a reference voltage comprised of a first voltage proportional to a phase voltage having the highest absolute value and a second voltage proportional to a rectified voltage from the rectifier bridge and controlling each of the semiconductor switches by comparing a voltage proportional to a phase voltage to said reference voltage.

With this method, the firing angle is automatically adjusted to the correct value. Also, the firing angle is the minimum required, thus reducing network disturbances.

In the preferred embodiment of the method according to the present invention, the reference voltage is produced by subtracting, from the first voltage, the difference between the second voltage and the first voltage.

Alternatively, the reference voltage can be produced by subtracting the second voltage from double the value of the first voltage.

Also according to the present invention there is provided a control unit for controlling inverting semiconductor switches connected in parallel with rectifying components of a rectifier bridge connected to an a.c. supply network, the control unit comprising comparator means for comparing voltages proportional to the absolute value of a phase voltage with a reference voltage for controlling the semiconductor switches, and circuit means for generating the reference voltages from a first voltage proportional to that phase voltage which has the highest absolute value and a second voltage proportional to a rectified voltage from the rectifier bridge.

In the preferred embodiment of the control unit according to the present invention, the circuit means for producing the reference voltage comprising comparator circuits means for generating the first voltage by selecting the highest of the phase voltages, differential circuit means for producing the difference between the first voltage and the second voltage and adder means for producing the sum of the first voltage and the difference obtained from the differential circuit means.

In this embodiment, the control unit comprises diode means for preventing conduction by one of the semiconductor switches of each phase when the other is conducting.

BRIEF DESCRIPTION OF THE DRAWINGS

Further features, objects and advantages of the present invention are described below with respect to an embodiment thereof given by way of example, reference being made to the drawings attached wherein.

THE PREFERRED EMBODIMENT

Figure 1:
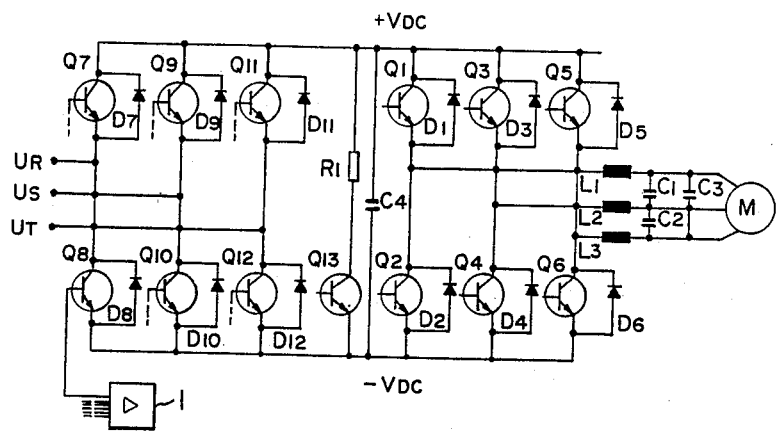
FIG. 1 shows a squirrel cage motor, the power stage of a frequency converter supplying the motor and a unit controlling inverting transistors.

FIG. 1 shows a squirrel cage motor M, which is fed by a frequency converter. The figure also shows the power stage of the frequency converter, in which the three phases $U_R$, $U_S$ and $U_T$ of the a.c. supply are rectified by diodes $D_7$–$D_{12}$ and the inversion is performed by transistors $Q_1$–$Q_6$. Zero diodes $D_1$–$D_6$ are also needed for the inversion. Inductances $L_1$–$L_3$ and capacitors $C_1$–$C_3$ connected between the motor input conductors serve as noise dampers. The rectified voltage, which is the difference between the voltages $+V_{DC}$ and $-V_{DC}$, is filtered by capacitor $C_4$.

The energy generated when the motor is braking is fed both into the resistor $R_1$, controlled by transistor $Q_{13}$, and into the three-phase network supplying the frequency converter, by converting the d.c. into a.c. by means of transistors $Q_7$–$Q_{12}$, which are connected in parallel with the diodes $D_7$–$D_{12}$ and controlled by the control unit 1.

Figure 2:
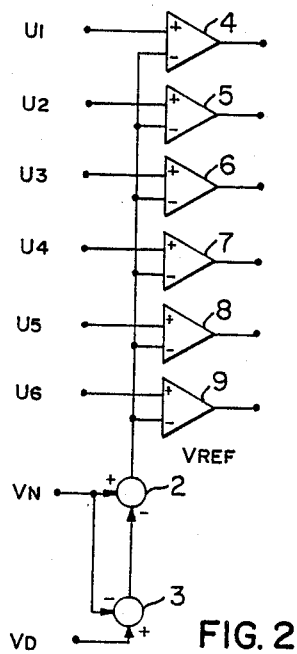
FIG. 2 shows comparators, which compare a voltage proportional to a highest phase voltage with a reference voltage, and a circuit producing the reference voltage.

FIG. 2 shows the control unit, which turns on each of the transistors $Q_7$–$Q_{12}$ during a half-cycle of one of the phase voltages $U_R$, $U_S$ and $U_T$ when the absolute value $U_1$–$U_6$ of the voltage proportional to the positive or negative phase voltage exceeds the reference voltage $V_{REF}$. The voltages $U_1$–$U_6$ correspond to the damped absolute values of the positive or negative phase voltages $+U_R$, $-U_R$, $+U_S$, $-U_S$, $+U_T$ or $-U_T$. The reference voltage $V_{REF}$ is produced by subtracting, in the differential circuit 2, the difference between the voltage in the d.c. circuit, and the voltage $V_N$, which is proportional to that phase voltage which has the highest absolute value, from this latter voltage $V_N$, said difference being produced by another differential circuit 3, or by substracting the voltage $V_D$ from the double value of the voltage $V_N$. The comparison is effected by means of comparators 4–9, the output signals of which are used to drive each of the transistors $Q_7$–$Q_{12}$ according to the power needs. If the voltage in the d.c. circuit is equal to the phase voltage with the highest absolute value, none of the transistors $Q_7$–$Q_{12}$ conducts. If the d.c. voltage rises, the reference voltage $V_{REF}$ falls and the transistor $Q_7$–$Q_{12}$ conduct, and the more the d.c. voltage rises, the longer the transistors will remain conducting.

Figure 3:
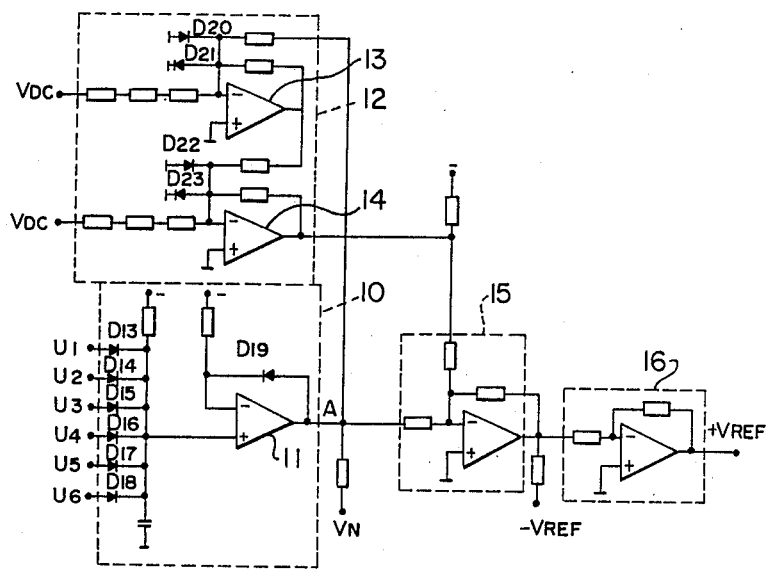
FIG. 3 shows a circuit for producing the reference voltage in greater detail.

FIG. 3 shows the circuit generating the reference voltage $V_{REF}$. A comparator circuit 10 produces the voltage $V_N$, which is proportional to that phase voltage which has the highest absolute value. A selector switch consisting of diodes $D_{13}$–$D_{18}$ selects the one of the voltages $U_1$–$U_6$ which has the highest absolute value. The selected voltage is input to the operational amplifier 11, which is connected as a voltage follower with diode $D_{19}$ correcting the diode threshold error caused by the selector switch. The voltage $V_N$ appears at point A.

From point A, the voltage $V_N$ is passed to a differential circuit 12, which produces the voltage $V_N-V_D$, i.e. the difference between the said voltage $V_N$ and the voltage $V_D$, the latter being proportional to the voltage in the d.c. circuit. The voltage $V_N$ and a damped negative d.c. voltage $-V_{DC}$ are applied to the input of the operational amplifier 13. The difference obtained and a damped positive d.c. voltage $+V_{DC}$ are input to another operational amplifier 14. Diodes $D_{20}$–$D_{23}$ protect the operational amplifiers 13 and 14 against excessive absolute voltages.

The adder 15 adds the voltage $V_N$ to the difference $V_N-V_D$ obtained from the differential circuit 12. A negative reference voltage $-V_{REF}$ is obtained at the output of the operational amplifier of the adder circuit 18. To obtain a positive reference voltage $+V_{REF}$, this negative voltage must be input to an inverting amplifier 16.

Figure 4:
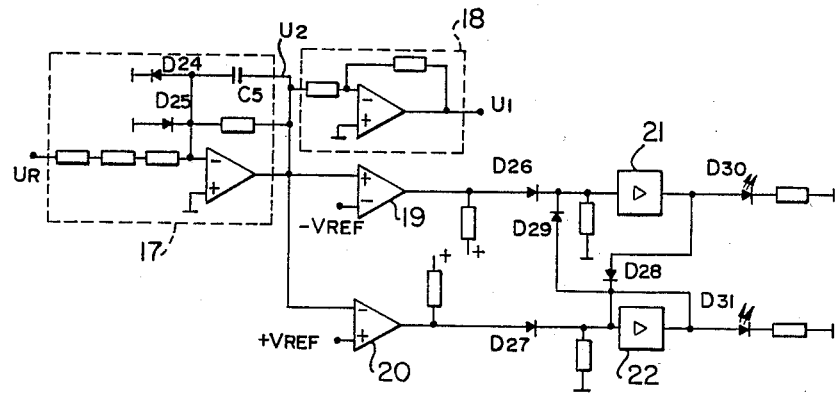
FIG. 4 is a more detailed view of the control unit connected to phase R.

FIG. 4 shows the part of the transistor control unit which drives transistors $Q_7$ and $Q_8$, connected to phase R. The transistors connected to the other phases are driven in a corresponding manner. The phase voltage $U_R$ is damped and applied to the input of an OP-amplifier 17, which outputs a voltage $U_2$, shown in FIG. 3, which corresponds to the negative half cycle and is proportional to the phase voltage. A voltage $U_1$ corresponding to the positive half-cycle is obtained by inputting the phase 17, capacitor $C_5$ takes care of noise filtering and diodes $D_{24}$–$D_{25}$ to protect the amplifier against excessive absolute voltages.

The voltage $U_2$ obtained from amplifier 17 is applied to one input of each of the two comparators 19 and 20. The other input of the first comparator 19 is connected to the negative reference voltage $-V_{REF}$, while the other input of the second comparator 20 is connected to the positive reference voltage $+V_{REF}$. Transistor $Q_7$ is controlled by the first comparator 19 and transistor $Q_8$ by the second comparator 20. To provide a drive signal for transistor $Q_7$, the signal obtained from the comparator 19 is passed via diode $D_{26}$ into an amplifier 21, where it is amplified, and applied to the LED $D_{30}$ of the optoisolator of the transistor controller. Similarly, transistor $Q_8$ is controlled by means of diode $D_{27}$, amplifier 22 and LED $D_{31}$. The function of diode $D_{28}$ is to block the passage of the signal through diode $D_{27}$ and thereby prevent conduction by transistor $Q_8$ when transistor $Q_7$ is conducting. Similarly, diode $D_{29}$ blocks the signal passage through diode $D_{26}$ and thus prevents conduction by transistor $Q_7$ when transistor $Q_8$ is conducting.

It will be obvious to those skilled in the art that the embodiments of the invention are not restricted to the example described above, but that they may instead be varied in the scope of the following claims.

I claim:

1. A method of controlling inverting semiconductor switches connected in parallel with rectifying components ($D_7$–$D_{12}$) of a rectifier bridge connected to an a.c. supply network, comprising the steps of:
    forming a reference voltage ($V_{REF}$) comprised of a first voltage ($V_N$) proportional to a phase voltage having the highest absolute value and a second voltage ($V_D$) proportional to a rectified voltage from said rectifier bridge; and
    controlling each of said semiconductor switches ($Q_7$–$Q_{12}$) by comparing a voltage ($U_1$–$U_6$) proportional to a phase voltage to said reference voltage ($V_{REF}$).

2. A method according to claim 1, which includes producing said reference voltage ($V_{REF}$) by subtracting, from said first voltage ($V_N$), the difference between said second voltage ($V_D$) and said first voltage ($V_N$).

3. A method according to claim 1, which includes producing said reference voltage ($V_{REF}$) by subtracting said second voltage ($V_D$) from double the value of said first voltage ($V_N$).

4. A control unit for controlling inverting semiconductor switches ($Q_7$–$Q_{12}$) connected in parallel with rectifying components ($D_7$–$D_{12}$) of a rectifier bridge connected to an a.c. supply network, said control unit (1) comprising:

comparator means (4–9; 19, 20) for comparing voltages ($U_1$–$U_6$) proportional to the absolute value of a phase voltage with a reference voltage ($V_{REF}$) for controlling said semiconductor switches ($D_7$–$D_{12}$); and circuit means for generating said reference voltage from a first voltage ($V_N$) proportional to that phase voltage which has the highest absolute value and a second voltage ($V_D$) proportional to a rectified voltage from said rectifier bridge.

5. A control unit according to claim 4, wherein said circuit means for producing said reference voltage comprise comparator circuit means (10) for generating said first voltage ($V_N$) by selecting the highest of the phase voltages ($U_1$–$U_6$), differential circuit means (12) for producing the difference between the first voltage ($V_N$) and said second voltage ($V_D$) and adder means (15) for producing the sum of said first voltage ($V_N$) and said difference ($V_N$–$V_D$) obtained from said differential circuit means (12).

6. A control unit according to claim 4, wherein said control unit (1) comprises diode means ($D_{26}$–$D_{29}$) for preventing conduction by either one of the semiconductor switches of each phase when the other is conducting.

* * * * *